United States Patent [19]
Chang et al.

[11] Patent Number: 5,798,897
[45] Date of Patent: Aug. 25, 1998

[54] INDUCTIVE WRITE HEAD WITH INSULATION STACK CONFIGURED FOR ELIMINATING REFLECTIVE NOTCHING

[75] Inventors: Thomas Young Chang; Edward Hinpong Lee, both of San Jose, Calif.

[73] Assignee: International Business Machines Corporation, Armonk, N.Y.

[21] Appl. No.: 734,158

[22] Filed: Oct. 21, 1996

[51] Int. Cl.⁶ ............................................ G11B 5/147
[52] U.S. Cl. ............................................ 360/126
[58] Field of Search ........................ 360/119, 126, 360/113

[56] References Cited

U.S. PATENT DOCUMENTS

| | | | |
|---|---|---|---|
| 4,423,451 | 12/1983 | Chi | 360/125 |
| 4,589,042 | 5/1986 | Anderson et al. | 360/125 |
| 4,636,897 | 1/1987 | Nakamura et al. | 360/119 |
| 4,636,901 | 1/1987 | Ohura et al. | 360/126 |
| 4,839,197 | 6/1989 | Henderson | 427/116 |
| 4,853,815 | 8/1989 | Diepers | 360/126 |
| 4,985,985 | 1/1991 | Das | 29/603 |
| 5,109,311 | 4/1992 | Hanazono et al. | 360/119 |
| 5,130,877 | 7/1992 | Hsie et al. | 360/126 |
| 5,184,394 | 2/1993 | Hsie et al. | 29/603 |
| 5,198,949 | 3/1993 | Narisawa et al. | 360/126 |
| 5,245,493 | 9/1993 | Kawabe et al. | 360/126 |
| 5,255,142 | 10/1993 | Williams et al. | 360/126 |
| 5,296,979 | 3/1994 | Kawabe et al. | 360/97.01 |
| 5,325,254 | 6/1994 | Cooperrider | 360/126 |
| 5,333,086 | 7/1994 | Frey et al. | 360/126 |
| 5,390,062 | 2/1995 | Matsuzawa et al. | 360/126 |
| 5,621,596 | 4/1997 | Santini | 360/126 |

FOREIGN PATENT DOCUMENTS

| | | | |
|---|---|---|---|
| 58-111116 | 7/1983 | Japan | G11B 5/12 |
| 60-10409 | 1/1985 | Japan | G11B 5/31 |
| 61-178710 | 8/1986 | Japan | G11B 5/31 |
| 62-062415 | 3/1987 | Japan . | |
| 63-16881 | 7/1988 | Japan . | |

*Primary Examiner*—A. J. Heinz
*Attorney, Agent, or Firm*—Baker, Maxham, Jester & Meador

[57] ABSTRACT

The present invention employs a ZTH defining insulation layer with a relatively long flat region along with a scheme for eliminating reflective notching from the next insulation layer on top of the ZTH defining insulation layer. This has been accomplished by providing the next insulation layer with a plurality of sloping surfaces which are oriented so that light reflected by the sloping surfaces is directed to areas remote from a pattern of a second pole tip in a photoresist layer which is employed for fabricating the second pole tip. The sloping surfaces terminate at a non-linear front edge which may include a plurality of straight edges extending in predetermined directions. The directions of these straight edges will define the orientations of the sloping surfaces. In one embodiment the straight edges may all be non-parallel and non-perpendicular to the ABS. In another embodiment a first plurality of the straight edges may be perpendicular to the ABS and a second plurality of the straight edges may be at a non-perpendicular angle to the ABS with the first and second plurality of straight edges alternating with respect to one another.

25 Claims, 15 Drawing Sheets

INDUCTIVE WRITE HEAD WITH INSULATION STACK CONFIGURED FOR ELIMINATING REFLECTIVE NOTCHING

BACKGROUND OF THE INVENTION

1. Field of the Invention

The present invention relates to an inductive write head with an insulation stack configured to eliminate reflective notching, and more particularly to a uniquely configured insulation stack which reflects light away from a second pole tip region of a photoresist layer during a fabrication step involved in patterning a second pole tip in the second pole tip region.

2. Description of the Related Art

An inductive write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head. The pole piece layers are connected at a back gap. A current is conducted through the coil layer, which produces a magnetic field across the gap between the pole pieces. This field fringes across the gap at the ABS for the purpose of writing information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. In most write heads the second pole tip is formed along with the yoke after the formation of the first insulation layer, the coil layer and the second and third insulation layers. Each insulation layer includes a hardbaked photoresist having a sloping front surface.

After construction, the first, second and third insulation layers present front sloping surfaces which face the ABS. The ZTH defining insulation layer rises from a plane normal to the ABS at an angle (apex angle) to the plane. The sloping surfaces of the hard-baked resist of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) are to be formed by plating. Unfortunately, when the location of the flare point is placed on the sloping surfaces of the insulation layers, ultraviolet light is reflected forward, toward the ABS, into photoresist areas at the sides of the second pole tip region. After development, the side walls of the photoresist are cut outwardly, causing the pole tip to be poorly formed after plating. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly degrades the head's ability to effectively write on the recording medium.

Future high density recording will require heads with first and second pole tips that have side walls that are vertically aligned. Such structures provide superior on track and track edge writing performance at high linear and high track densities. Ion milling techniques are typically used to fabricate such write head structures. In this process the first pole is milled using the second pole tip as a mask. Automatic alignment of the first and second pole tips is achieved since the second pole tip is used as the milling mask to protect the region of the first pole tip that is directly beneath it while the unprotected P1 material on either side of the second pole tip P2 is removed by the milling process. The effect of this milling process forms a "notched P1" structure which has the aligned vertical side walls between P1 and P2. Unfortunately, when the second pole tip is poorly formed, the notches in the first pole piece are also poorly formed.

In order to minimize the aforementioned reflective notching problem the ZTH defining insulation layer may be provided with a relatively long planar region commencing at a sloping front recessed end which is spaced from the ABS. The apex of this front recessed end defines the ZTH. The flare point of the second pole piece is located in this planar region. Since the region is planar, light is not deflected transversely; instead the light is reflected back to its source, thereby obviating reflective notching from the ZTH defining insulation layer. If the ZTH defining insulation layer is thin, commencement of the planar region is close to the ZTH. Therefore, the flare point can be placed on the planar region very close to the ZTH to produce a very efficient write head. Since the second pole tip is better formed the first pole piece can be notched by ion milling to produce better formed notches in the first pole piece at the ABS. Further, the second pole piece forms a mask to protect the write gap layer during the ion milling step used to construct the coil layer.

While the aforementioned arrangement has minimized reflective notching, it has not eliminated it. Unfortunately, the next insulation layer on top of the ZTH defining insulation layer also causes reflective notching. This next insulation layer has a front sloping surface which faces the ABS and which terminates in an edge which is parallel to the ABS. During the photo-lithography process making the yoke and the second pole tip light is reflected from the sloping surface of the next insulation layer causing reflective notching adjacent the pole tip region of the photoresist mask.

3

While the degree of reflective notching caused by the next insulation layer is not as severe as reflective notching caused by the prior art ZTH defining insulation layer it would be desirable if this reflective notching could be eliminated so that a still better formed second pole tip can be fabricated.

Another scheme for minimizing reflective notching and P1 notching problems is to construct the second pole piece of first and second components wherein the first component forms the second pole tip. The first component is constructed before the insulation layers to eliminate the reflective notching problem. After forming the first pole piece layer and the write gap layer, a photoresist layer is spun on the partially completed head. The photoresist layer is very flat so that ultraviolet light from the photo-patterning step is not reflected forward. After plating the first component the photoresist layer is removed and the first insulation layer, the coil layer and the second and third insulation layers are formed. The second component of the second pole piece is then stitched (connected) to the first component and extends from the ABS to the back gap. Since the second pole tip is well-formed, well-formed notches can be made in the first pole piece. However, with this head, the ZTH is dependent upon the location of the recessed end of the first component. Since the first component has to be long enough to provide a sufficient stitching area, this length may result in undesirable flux leakage between the first and second pole pieces. Further, the second pole piece component extends to the ABS. Since the second component is typically wider than the first component, as viewed from the ABS, the second pole piece has a T-shape. The upright portion of the T is the front edge of the first component of the second pole piece, and the cross of the T is the front edge of the second component. A problem with this configuration is observed during operation when flux fringes from the outer corners of the second component to the first pole piece, causing adjacent tracks to be overwritten.

Accordingly, there is a strong felt need to provide an inductive write head wherein definition of the side walls of the second pole tip are better formed and are substantially unaffected by the locations of the flare point and the ZTH.

SUMMARY OF THE INVENTION

The present invention employs the aforementioned ZTH defining insulation layer with a relatively long flat region, combined with a novel and unique scheme for eliminating reflective notching from the next insulation layer on top of the ZTH defining insulation layer. In this regard, the next insulation layer is provided with a plurality of front sloping surfaces oriented so that light reflected therefrom is not deflected into regions adjacent the second pole tip region. Each sloping surface may terminate at a front straight edge. The directions of these straight edges will define the orientations of the sloping surfaces. The first straight edges define a non-linear front edge. In one embodiment the straight edges may all be non-parallel and non-perpendicular to the ABS. In another embodiment a first plurality of the straight edges may be perpendicular to the ABS and a second plurality of the straight edges may be non-perpendicular to the ABS with the first and second plurality of straight edges alternating with respect to one another. It should be noted that these embodiments are in sharp contrast to the prior art next insulation layer which has a single straight edge, the straight edge being parallel to the ABS and defining a sloping surface which deflects incident light transversely into regions adjacent the pole tip region, causing reflective notching. The method of the invention employs a mask which forms one of the insulation layers, other than the ZTH defining insulation layer, with the aforementioned sloping surfaces.

4

An object of the present invention is to provide an inductive write head and method of making wherein reflective notching can be virtually eliminated.

Another object is to provide an inductive write head with an insulation stack which does not deflect light to adjacent sides of a pole tip region during a step of patterning a photoresist layer for fabricating a yoke and second pole tip of a second pole piece.

A further object is to provide (1) a relatively flat and thin ZTH defining insulation layer and (2) an insulation layer, other than the ZTH layer, with sloping surfaces which direct light away from sides of a pole tip region during fabrication of the second pole piece.

Still another object of the present invention is to provide an inductive write head having a well-formed second pole tip in which the flare point is relatively close to the ABS.

Still a further object is to provide an inductive write head wherein the construction of a well-formed second pole tip is not dependent upon the locations of the flare point.

Still another object is to provide an inductive write head which has well-formed first and second pole pieces at the ABS, a ZTH which is recessed a relatively short distance in the head from the ABS and/or a flare point which is recessed a relatively short distance from the ZTH into the head.

Still a further object is to provide a method of making an inductive write head where there is virtually no reflective notching of the side walls of a resist frame formed to construct a second pole tip, even though the flare point is placed relatively close to the ABS.

Other objects and attendant advantages of the present invention will become apparent upon reading the following description taken together with the accompanying drawings.

DESCRIPTION OF THE PREFERRED EMBODIMENTS

Figure 1:
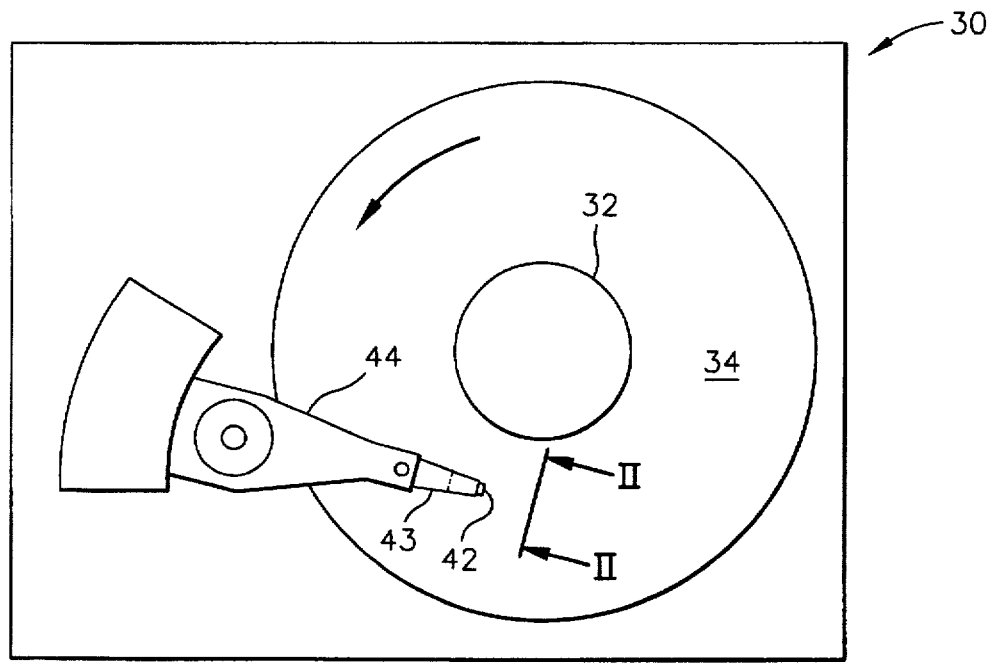
FIG. 1 is a planar view of an exemplary magnetic disk drive.
Figure 2:
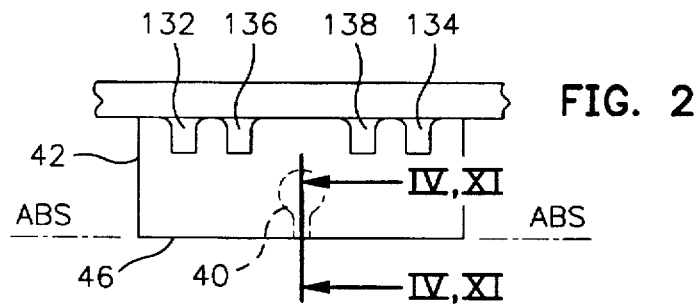
FIG. 2 is an end view (trailing edge) of a slider taken along plane II—II showing a magnetic head in hidden lines.
Figure 3:
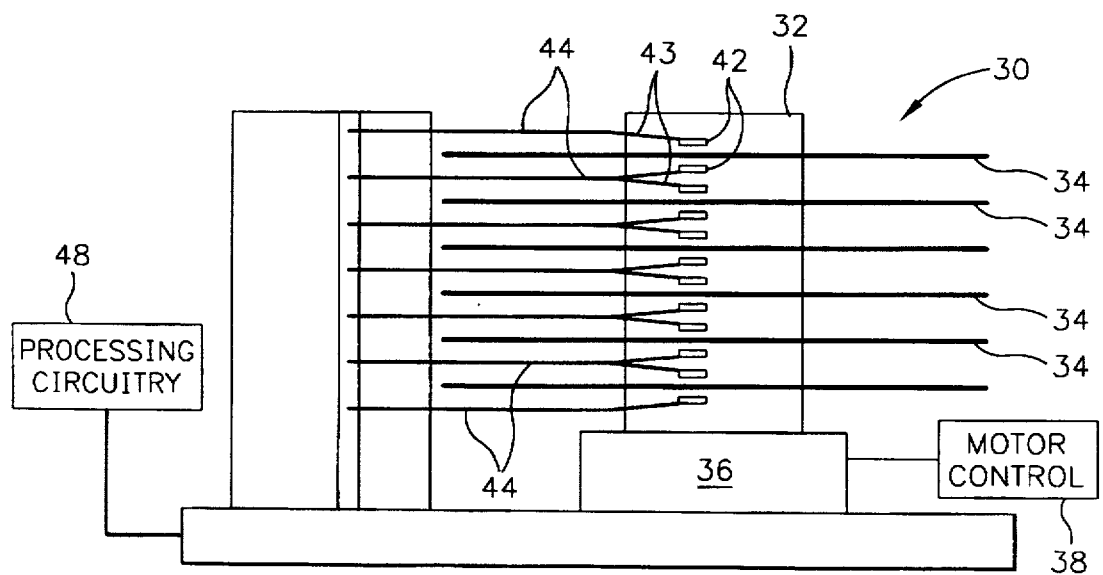
FIG. 3 is an elevation view of the magnetic disk drive of FIG. 1 wherein multiple disks and magnetic heads are employed.

Referring now to the drawings wherein like reference numerals designate like or similar parts throughout the several views there is illustrated in FIGS. 1 and 2 a magnetic disk drive 30. The drive 30 includes a spindle 32 which supports and rotates a magnetic disk 34. The spindle 32 is rotated by a motor 36 which is controlled by a motor controller 38. A magnetic head 40, which may be a merged MR head for recording and reading information on the disk 34, is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36, the slider is supported on a thin (typically, 0.075 µm) cushion of air (air bearing) by the air bearing surface (ABS) 46 of the slider and the magnetic head. The magnetic head 40 is then employed for writing information to multiple circular tracks on the surface of the disk 34 and for reading information therefrom. Processing circuitry 48 exchanges signals representing such information with the head 40, provides motor drive signals, and also provides control signals for moving the slider to various tracks.

Figure 4:
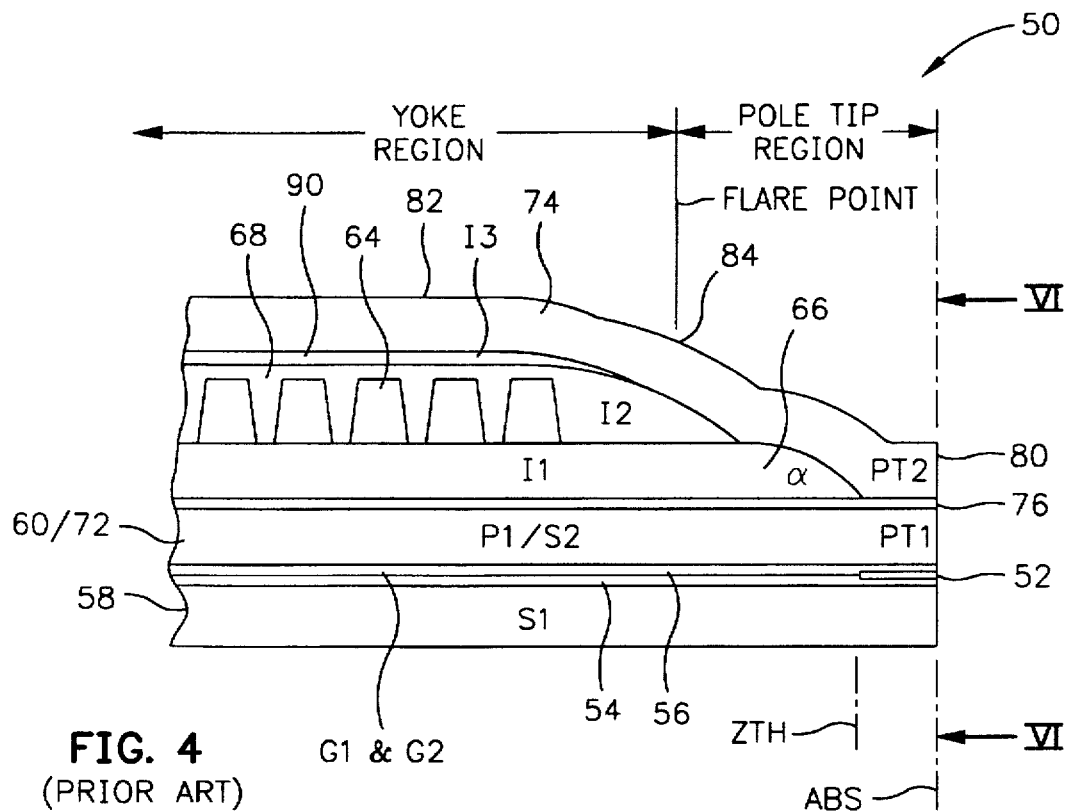
FIG. 4 is an elevation side view of a front portion of a prior art magnetic head taken along plane IV—IV of FIG. 2.

FIG. 4 is a side cross-sectional elevation view of a prior art merged MR head 50 which has a write head portion and a read head portion. The read head portion of the merged MR head includes an MR sensor 52 sandwiched between first and second gap layers 54 and 56, the first and second gap layers, in turn, being sandwiched between first and second shield layers 58 and 60. In response to external magnetic fields, the resistance of the MR sensor 52 changes. A sense current conducted through the sensor causes these changes to be manifested as potential changes. These potential changes are processed by the processing circuitry 48 shown in FIG. 3.

Figure 7:
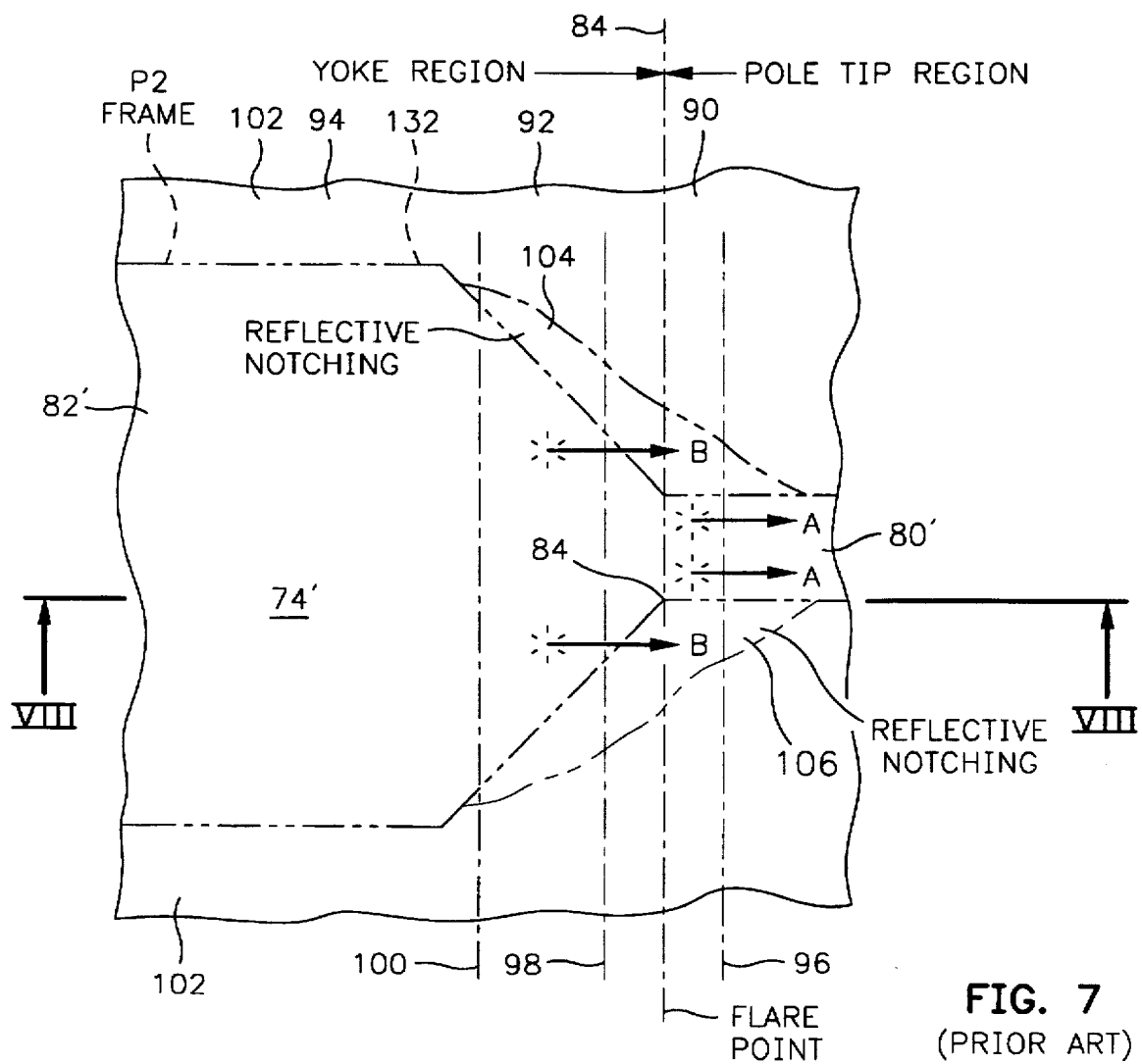
FIG. 7 is a planar view of the partially completed head shown in FIG. 6 with the resist frame shown in phantom.

The write head portion of the head includes a coil layer 64 sandwiched between first and second insulation layers 66 and 68. A third insulation layer 70 may be employed for planarizing the head to eliminate ripples in the second insulation layer caused by the coil layer 64. The coil layer 64, and the first, second and third insulation layers 66, 68 and 70 are sandwiched between first and second pole piece layers 72 and 74. The first and second pole piece layers 72 and 74 are separated by a write gap layer 76 at the ABS and are magnetically coupled at a back gap (not shown) which is spaced from the ABS. As shown in FIG. 4, the second pole piece layer 74 has a pole tip 80 and a yoke 82, the merging of these components being defined by a flare point 84 which is the location where the second pole piece layer 74 begins to widen as it recesses in the head. The second pole tip 80 extends from the ABS to the flare point 84, and the yoke extends from the flare point 84 to the back gap. In FIG. 7 are shown a pole tip region 80', a yoke region 82' and the flare point 84' as defined by a resist P2 frame. It should be noted that the merged MR head 50 employs a single layer 60/72 to serve a double function as a second shield layer for the read head and as a first pole piece for the write head. A piggyback MR head employs two separate layers for these functions.

Figure 8:
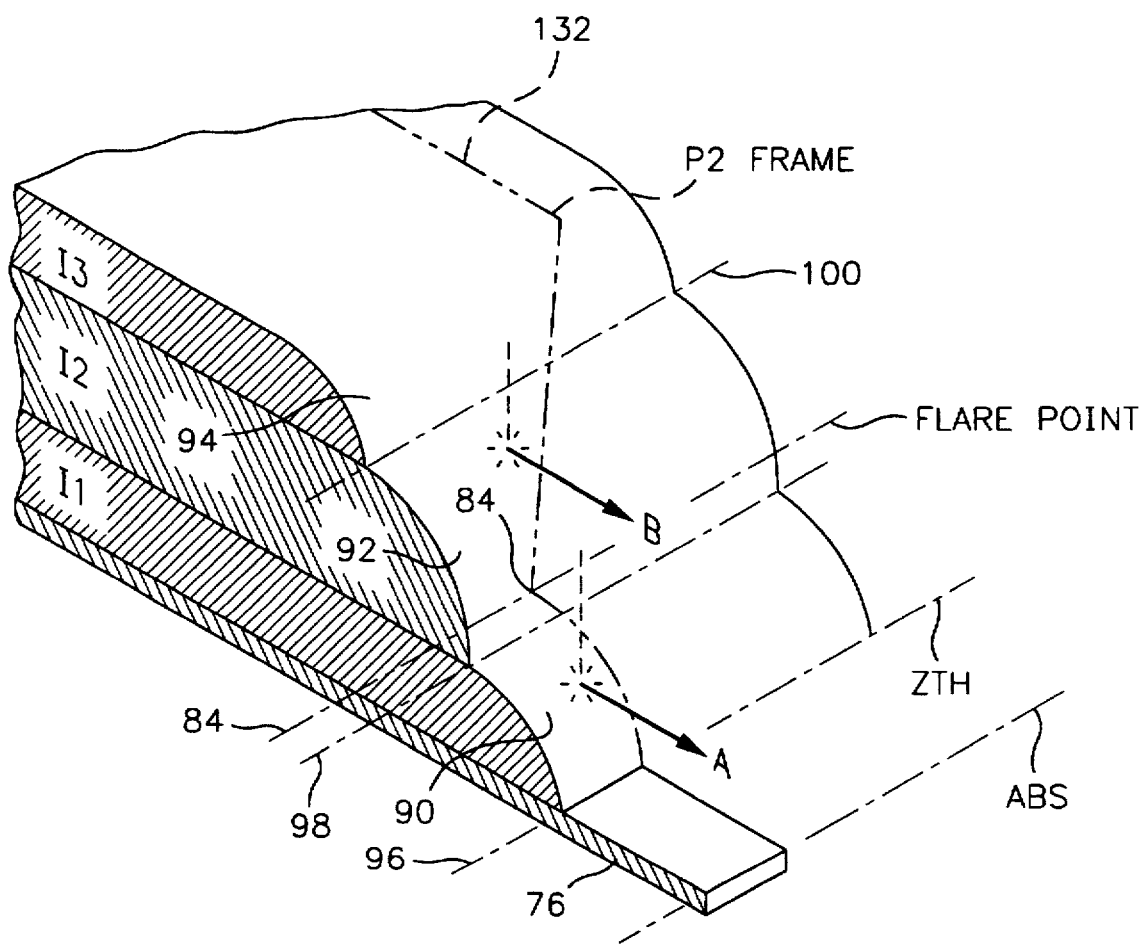
FIG. 8 is an isometric view taken generally along plane VIII—VIII of FIG. 7 with the photoresist layer removed so as to show the first, second and third insulation layers.

The location of the flare point 84, shown in FIGS. 4, 7 and 8, is an important design parameter of the write head. The further this point is recessed into the head, the longer the pole tip 80, which increases magnetic inductance and the likelihood that the pole tip 80 will saturate in response to flux from the coil layer 64. In the past it has been difficult to locate the flare point closer to the ABS than 10 µm because of a fabrication problem in making the second pole tip 80.

Another important design parameter in making the write head is the location of a zero throat height (ZTH), which is where the first and second pole piece layers 72 and 74 first separate from one another behind the ABS. It is important to locate the ZTH as close as possible to the ABS (typically within about 1 µm) in order to reduce the flux loss between the pole pieces 72 and 74 before the fields reach the gap layer 76 at the ABS. In the prior art, locating the ZTH close to the ABS contributed to the aforementioned problem of fabricating a well-defined second pole tip 80.

Figure 5:
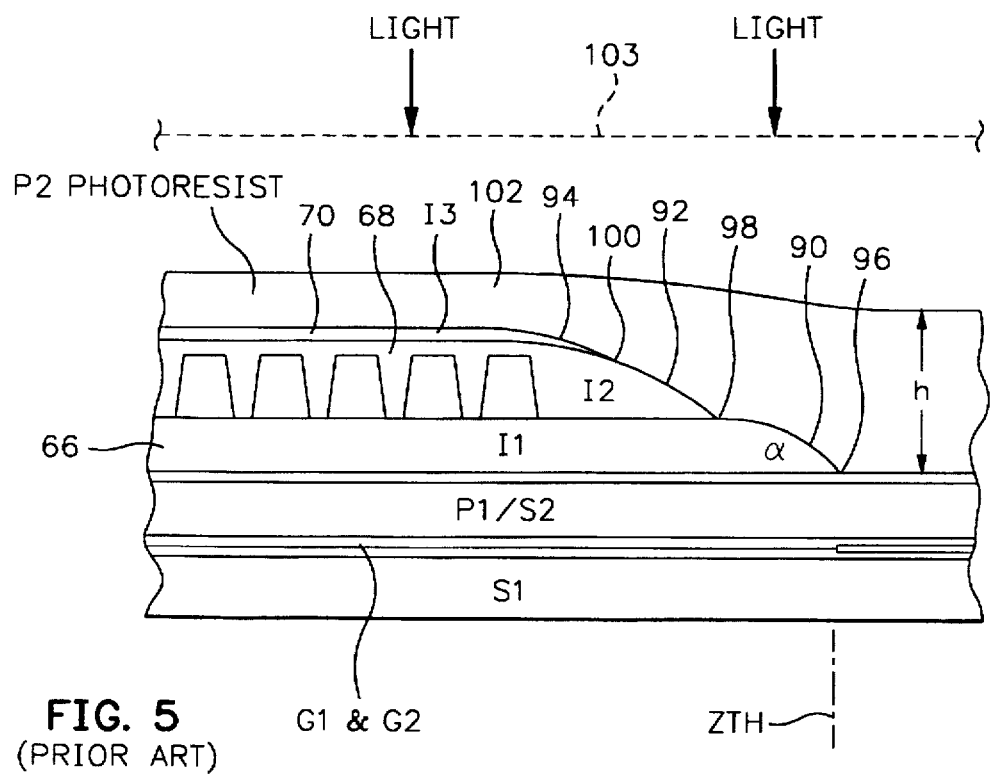
FIG. 5 is an elevation side view of the prior art head in FIG. 4 in a partially completed state.

FIG. 5 shows the prior art head 50 of FIG. 4 during the step of constructing the second pole piece 74 (see FIG. 4). In FIG. 5 the first, second and third insulation layers 66, 68 and 70 are shown with sloping surfaces 90, 92 and 94 respectively, which terminate at apexes 96, 98 and 100 respectively. As stated hereinabove, the first, second and third insulation layers are hard-baked photoresist which results in the sloping surfaces 90, 92 and 94 being highly reflective to light. All of the sloping surfaces 90, 92 and 94 face the pole tip region where the second pole tip 80 of the second pole piece 74 is to be formed. The second pole piece is formed with a photoresist layer 102 spun on top of the partially completed head. The height h of the photoresist layer may be as much as 12 μm thick in the pole tip region and is typically approximately 4.5 μm thick above the third insulation layer 70. Since the flare point 84 of the second pole piece 74 (shown in FIGS. 4, 7 and 8) is located on the sloping surfaces of the insulation layers, light directed through a second pole-shaped opening (not shown) in a mask 103 will be reflected from the sloping surfaces forward toward the ABS into areas of the photoresist layer 102 adjacent the pole tip region. This causes the pole tip region to be wider than the opening in the mask 103. This is referred to as "reflective notching" and is illustrated in FIG. 7.

The photoresist pattern for the second pole piece is shown at 74' which comprises the pole tip pattern 80' and the yoke pattern 82'. This is referred to as the "P2 frame". Reflective notching of the photoresist layer 102 by light reflected at an angle of incidence from the sloping layers of the insulation layers is shown at 104 and 106. When light ray A is directed downwardly during the photo-imaging step of the photoresist, it is reflected at an angle of incidence into the pole tip region without causing any reflective notching of the second pole tip. However, light ray B from the photo-imaging process is reflected from the sloping surfaces of the insulation layers behind the flare point 84 at an angle of incidence into the photoresist 102 into a side region outside the intended pole tip 80' shown in FIG. 7. It is light reflection B and similar light reflections that cause the reflective notching shown in FIG. 7.

Figure 6:
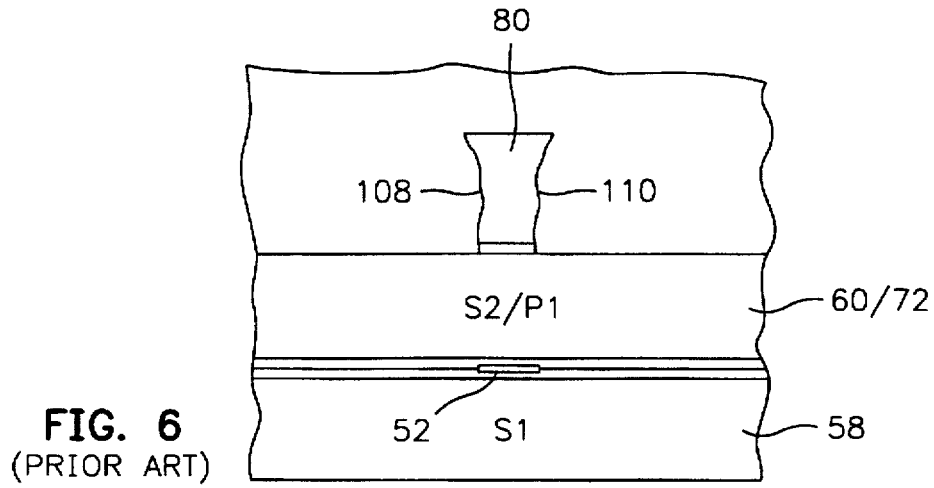
FIG. 6 is an ABS view of the magnetic head taken along plane VI—VI of FIG. 4.

When the second pole piece 74 is plated and the photoresist layer 102 is removed the head is complete, as shown in FIG. 4. However, the pole tip 80 is poorly formed, exhibiting irregular side walls 108 and 110, as shown in FIG. 6. Furthermore, photoresist notching results in a second pole tip 80 that has wider areas at the upper pole tip region than at the base of the pole tip (adjacent the write gap). When the irregular second pole tip 80 is used as a milling mask to notch the first pole tip 72, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72.

Figure 9:
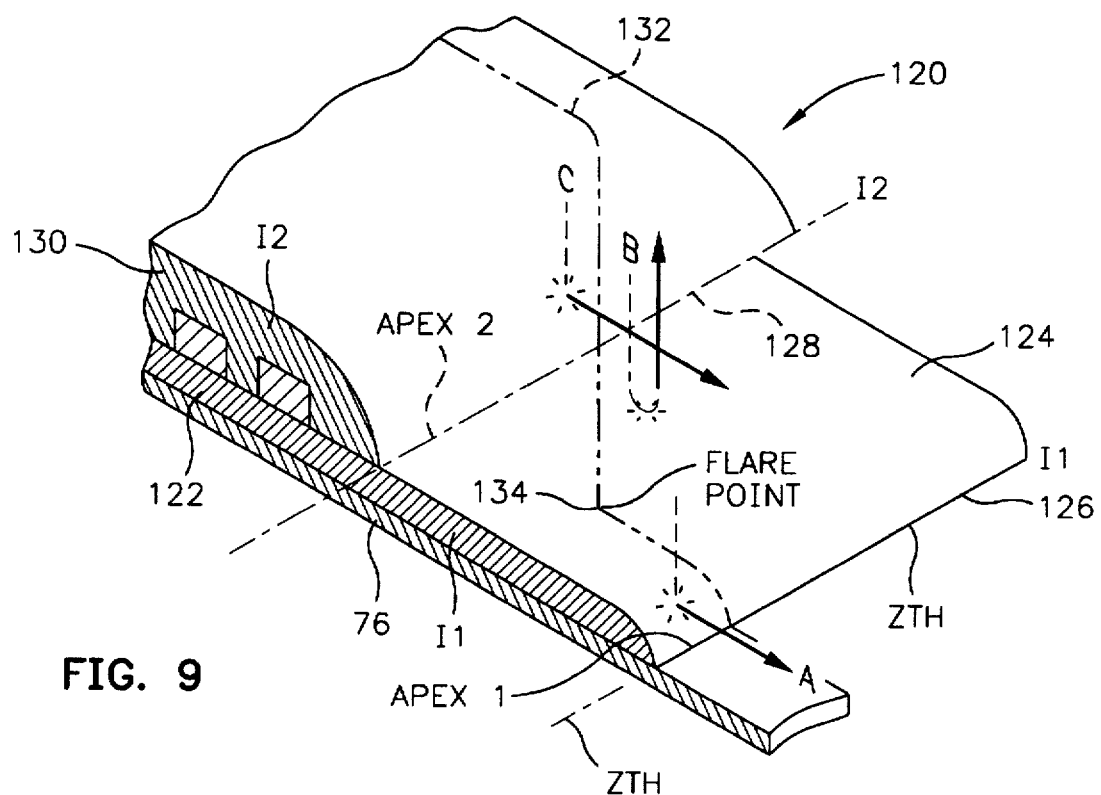
FIG. 9 is an isometric illustration of a portion of the insulation layers of a write head wherein the first insulation layer has a large planar region.
Figure 10:
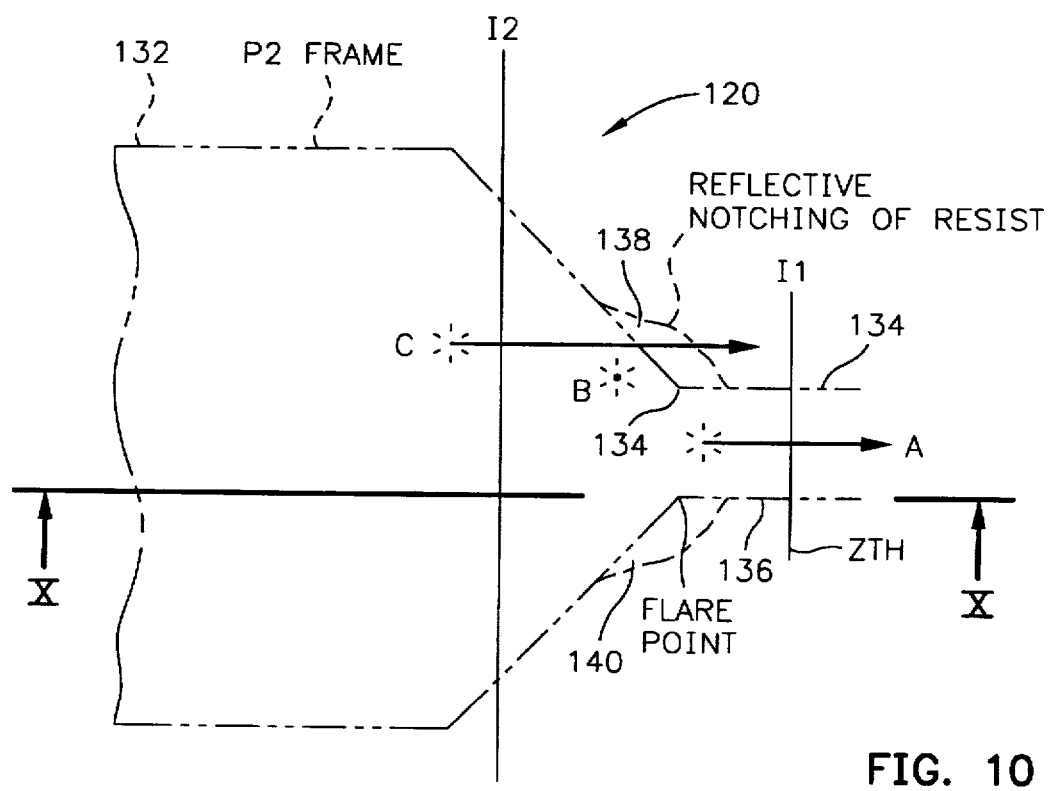
FIG. 10 is a schematic plan view of the illustration shown in FIG. 9 with a P2 frame shown in phantom.

In FIGS. 9 and 10 there is shown a modified insulation stack 120 for a write head which was filed in a commonly assigned co-pending application Ser. No. 08/560,062 filed on Nov. 17, 1995. The first insulation layer 122 has a large flat portion 124 which commences at a front edge or apex 126 and terminates at a front edge or apex 128 of a second insulation layer 130. Both edges 126 and 128 are parallel to the ABS. The front edge 126 defines the ZTH of the head making the first insulation layer 122 the ZTH defining insulation layer. An outline 132, which is a P2 frame, is shown in phantom for the patterning of the second pole piece in a photoresist layer (not shown). The outline has a flare point at 134 which is where the second pole piece flares out from the pole tip region to form the yoke of the second pole piece. After transition through the photoresist layer 102 light ray A is reflected from the sloping edge of the first insulation layer straight into the pole tip region which does not cause any reflective notching. When light ray B is reflected by the flat portion 124 of the first insulation layer, it is reflected back toward its source and does not cause any reflective notching. A majority of the reflective notching is eliminated by the scheme shown in FIGS. 9 and 10. However, light ray C striking the sloping surface of the second insulation layer 130 is reflected into regions 138 and 140 adjacent side walls 134 and 136 of the pole tip region as shown in FIG. 10. It would be desirable if the reflective notching caused by sloping surfaces of insulation layers other than the ZTH defining insulation layer could be eliminated.

Figure 11:
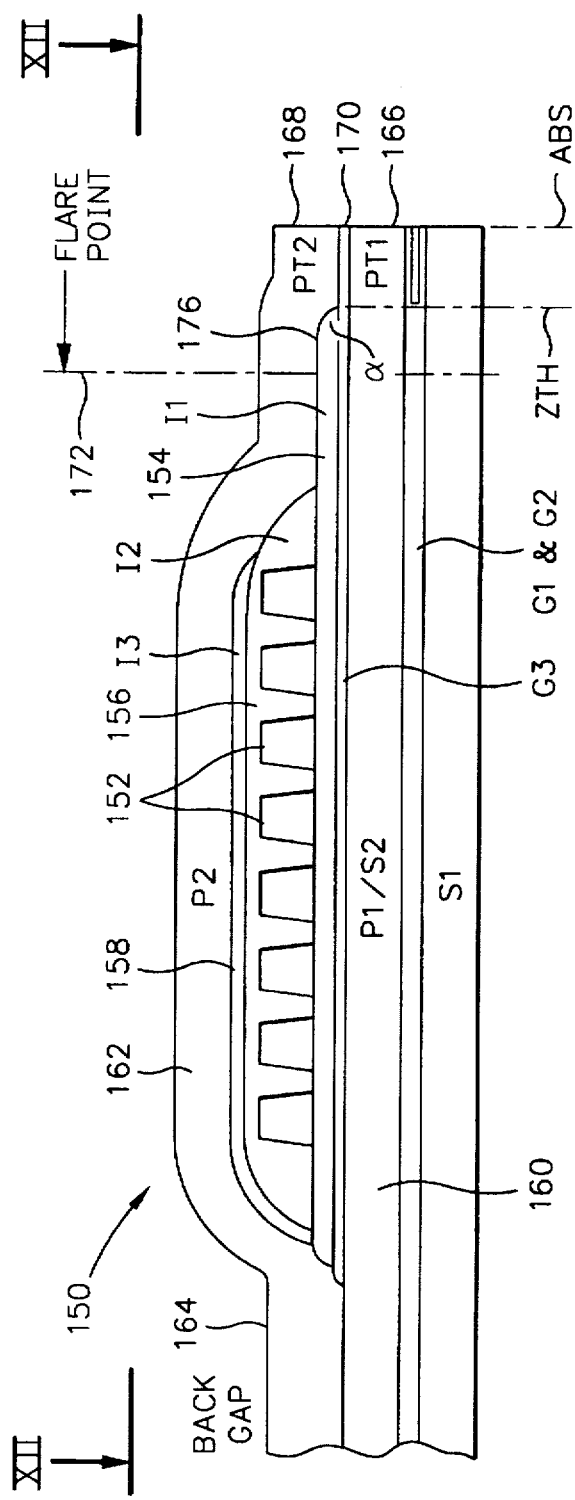
FIG. 11 is a side cross-sectional elevation view of a portion of the present write head taken along plane XI—XI of FIG. 2.
Figure 12:
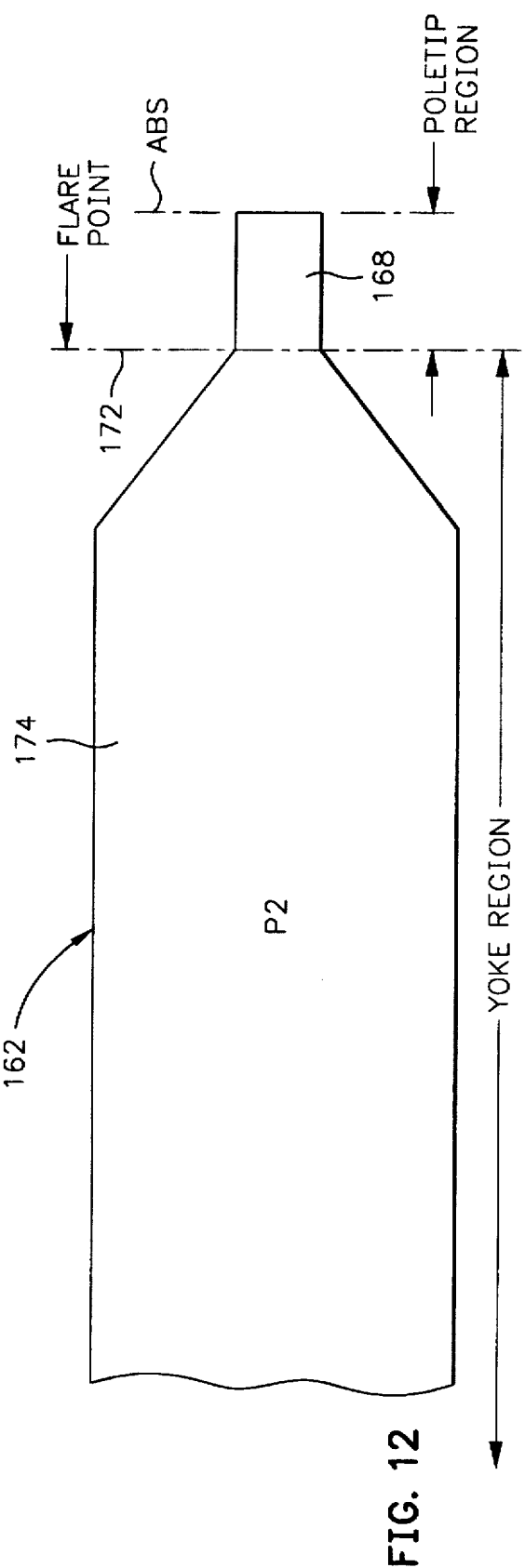
FIG. 12 is a view taken along plane XII—XII of FIG. 11.

FIGS. 11–15 show a first embodiment 150 of the present invention which improves the scheme shown in FIGS. 9 and 10 to completely eliminate reflective notching of the second pole tip. The first embodiment is the write head portion of the combined head 150 shown in FIG. 11. The write head includes a coil layer 152 which is sandwiched between first and second insulation layers 154 and 156. A third insulation layer 158 is on top of the second insulation layer 156. The first, second and third insulation layers 154, 156 and 158 form an insulation stack which is sandwiched between first and second pole pieces 160 and 162. The first and second pole pieces are magnetically connected at a back gap 164 and have first and second pole tips 166 and 168 which are separated by a gap layer 170. As shown in FIG. 12, the pole tip 168 extends from the ABS to a flare point 172. The second pole piece 162 also has a yoke portion 174 which extends from the flare point 172 to the back gap 164. It should be noted from FIG. 11 that the flare point 172 is located within a flat portion 176 of the first insulation layer in a similar manner as described for the insulation stack shown in FIGS. 9 and 10.

Figure 13:
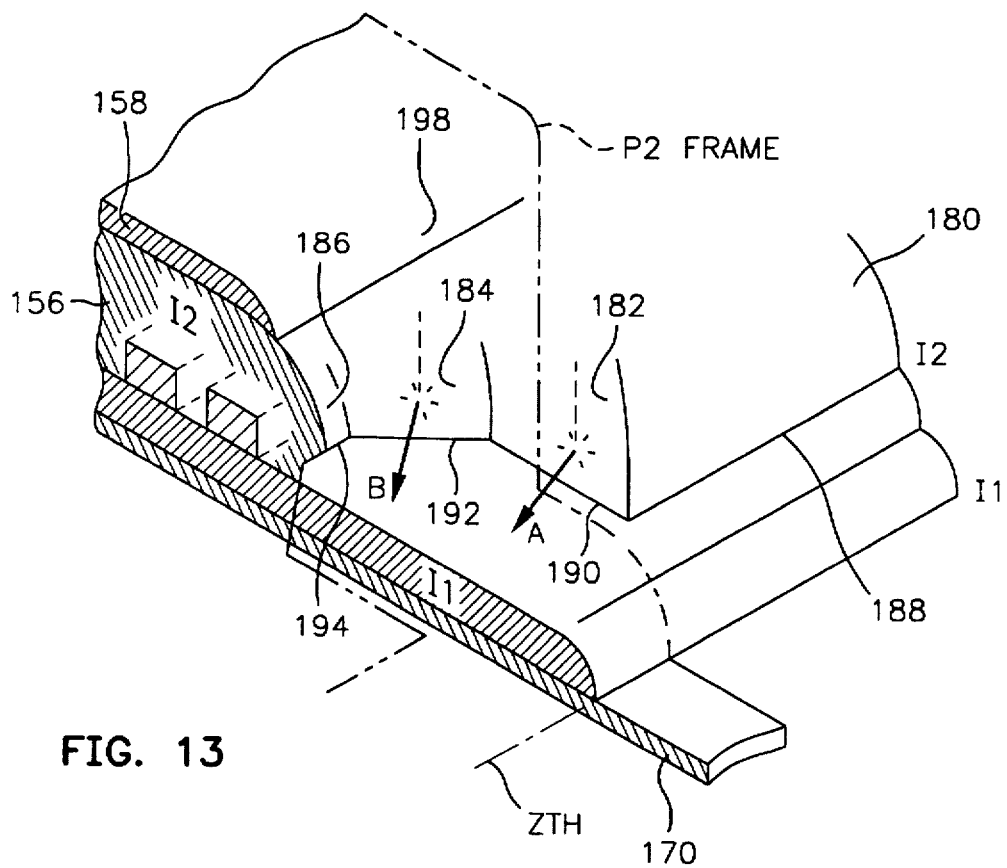
FIG. 13 is an isometric view of the insulation stack of the write head of FIG. 11.
Figure 14:
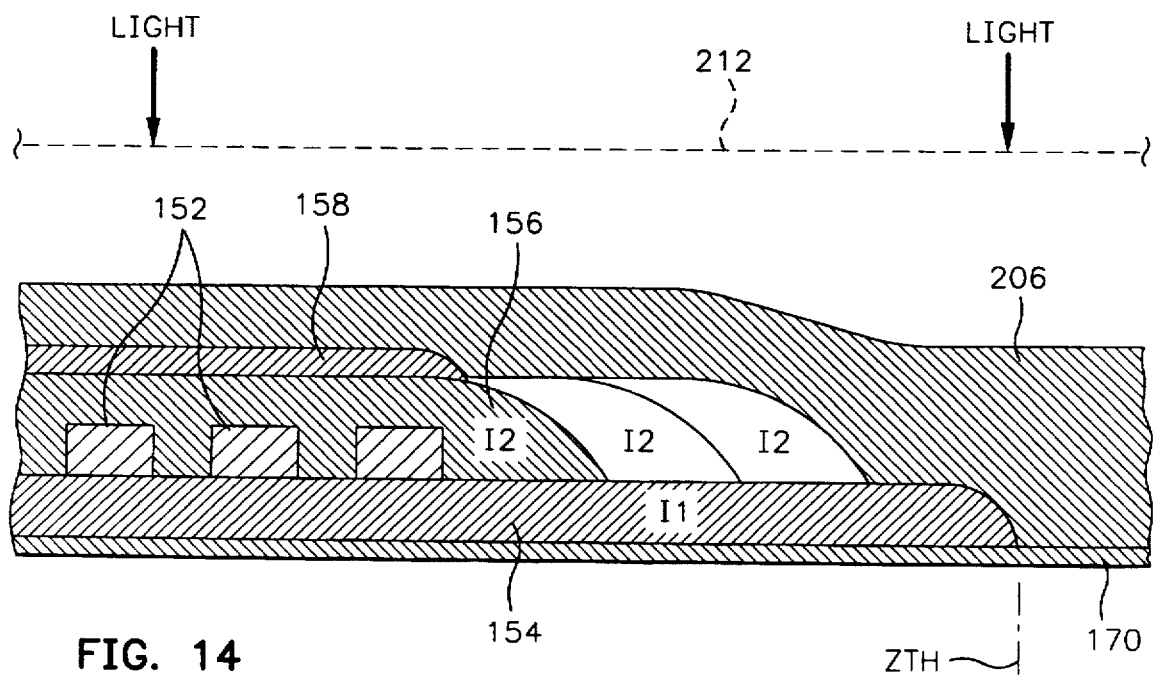
FIG. 14 is a cross-sectional elevation view of the insulation stack of the write head of FIG. 11 showing a process step which employs a resist layer mask (P2 frame) and light for fabricating the second pole piece (not shown).
Figure 15:
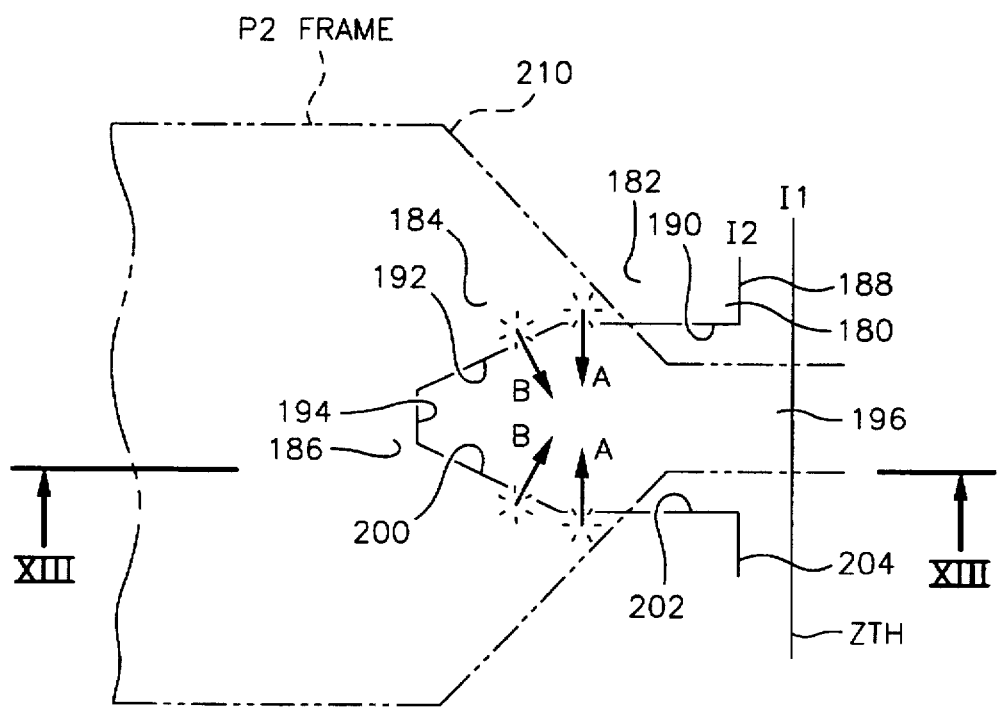
FIG. 15 is a schematic plan illustrating incidence light reflected from the second insulation layer of the insulation stack shown in FIG. 14.

The difference in the embodiment shown in FIGS. 11 and 12 is the configuration of a front portion of the second insulation layer as shown in FIGS. 13–15. As shown in FIG. 13, the second insulation layer has a plurality of sloping surfaces 180, 182, 184 and 186 which commence at front edges 188, 190, 192 and 194 respectively. As shown in FIGS. 13 and 15, these sloping surfaces are configured so that incidence light reflected therefrom during the fabrication step of making the second pole tip is not deflected into areas adjacent the pole tip region. As shown in FIGS. 13 and 15, light reflected from the sloping surface 180 will not be deflected adjacent to the pole tip region 196, light A reflected from sloping surface 182 will be directed parallel to the ABS, outside the area of the pole tip region 196, light B reflected from sloping surface 184 will be reflected into areas away from the pole tip region 196, and light reflected from the sloping surface 186 will be directed straight into the pole tip region 196, causing no problem. Accordingly, no light reflected from the sloping surfaces of the second insulation layer will be directed into areas immediately adjacent the pole tip region 196. This virtually eliminates all reflective notching. Light reflected from the sloping surface 198 of the third insulation layer 158 will make an insignificant contribution to reflective notching, because the sloping surface is small and far from the pole tip region 196. Optionally, the third insulation layer 158 can be fabricated to have sloping surfaces overlapping the sloping surfaces of the second insulation layer so that they likewise reflect light away from the pole tip region.

In the preferred embodiment, the edges 188, 190, 192 and 194 and the complementary edges 200, 202 and 204, shown in FIG. 15, are preferably straight. The sloping surface 180 and a complementary sloping surface the opposite side are defined by linear edges 188 and 204, as shown in FIGS. 13 and 15, these edges being colinear and parallel to the ABS. The sloping surfaces 180, 182, 184, 186 and the complementary sloping surfaces opposite thereto are defined by a non-linear edge which comprises straight edges 190, 192, 194, 200 and 202. In this first embodiment, the non-linear edge has straight edges 190 and 202 which are perpendicular to the ABS, edges 192 and 200 which are at an obtuse angle and an acute angle to the ABS and straight edge 194 which is parallel to the ABS. Locations of these straight edges, which Collectively compose the non-linear edge, may be in different locations which will be described hereinafter for other embodiments of the present invention. The only requirement is that the straight edges define sloping surfaces which reflect light into areas of the photoresist layer, and thereby obviate reflective notching.

Figure 16:
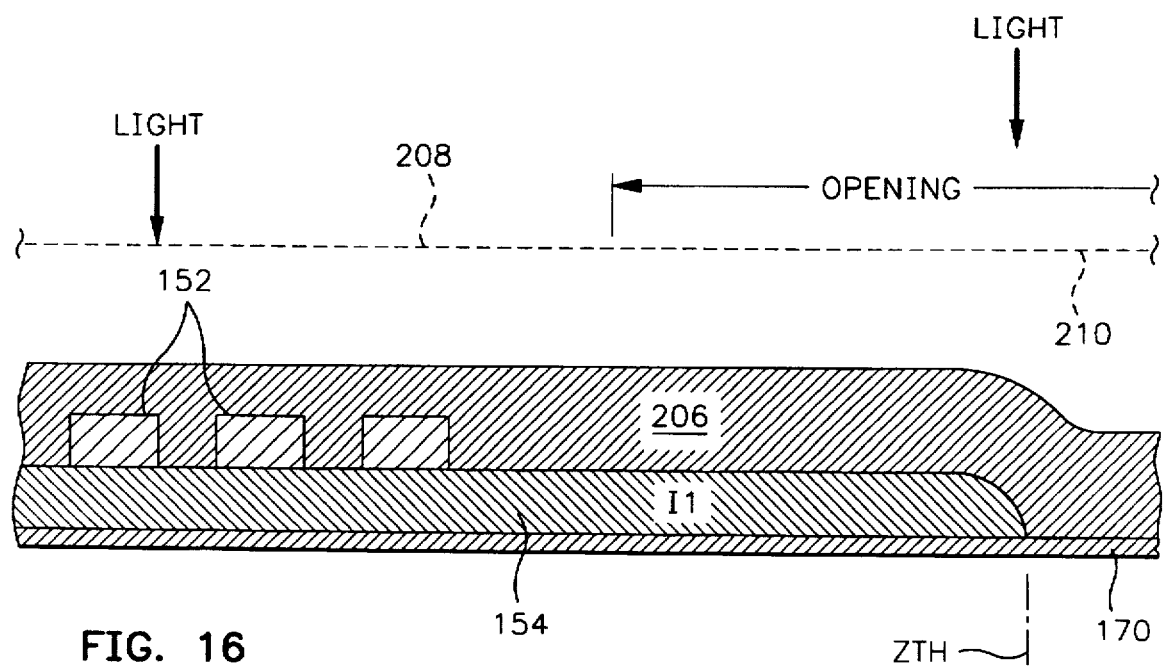
FIG. 16 is a side elevation of a partially completed write head of FIG. 11 showing a process step of fabricating an insulation layer other than the ZTH defining insulation layer.

An exemplary method of making the first embodiment is shown in FIGS. 16, 14 and 11. In FIG. 16 a photoresist layers 206 is spun on top of the coil and first insulation layers 152 and 154. An opaque mask 208 is then positioned above the photoresist layer 206 as shown in FIG. 16. The opaque mask has an opening 210 which has a perimeter which corresponds to the edges 188, 190, 192, 194, 200, 202 and 204 shown in FIG. 15. Light is then directed through the opening 210 to expose the photoresist layer 206 in the region encompassed by the edges 188, 190, 192, 194, 200, 202 and 204 shown in FIG. 15. The photoresist layer 206 is then developed in a developer which removes the photoresist layer portion in the aforementioned region producing the second insulation layer 156 shown in FIG. 13. After forming the third insulation layer 158 the photoresist layer 206 is spun on the third insulation layer 158 as shown in FIG. 14. An opaque mask 212 is then positioned above the photoresist layer 206. The opaque mask 212 has an opening (not shown) which corresponds to the perimeter of the second pole piece shown in FIG. 12. Light is then directed through the opening in the mask 212 into the photoresist layer 206. The photoresist layer 206 is then developed with a developer which removes the photoresist within the frame providing a pattern for constructing the yoke and pole tip of the second pole piece. The second pole piece is then fabricated by plating which results in the head shown in FIG. 11.

Figure 17:
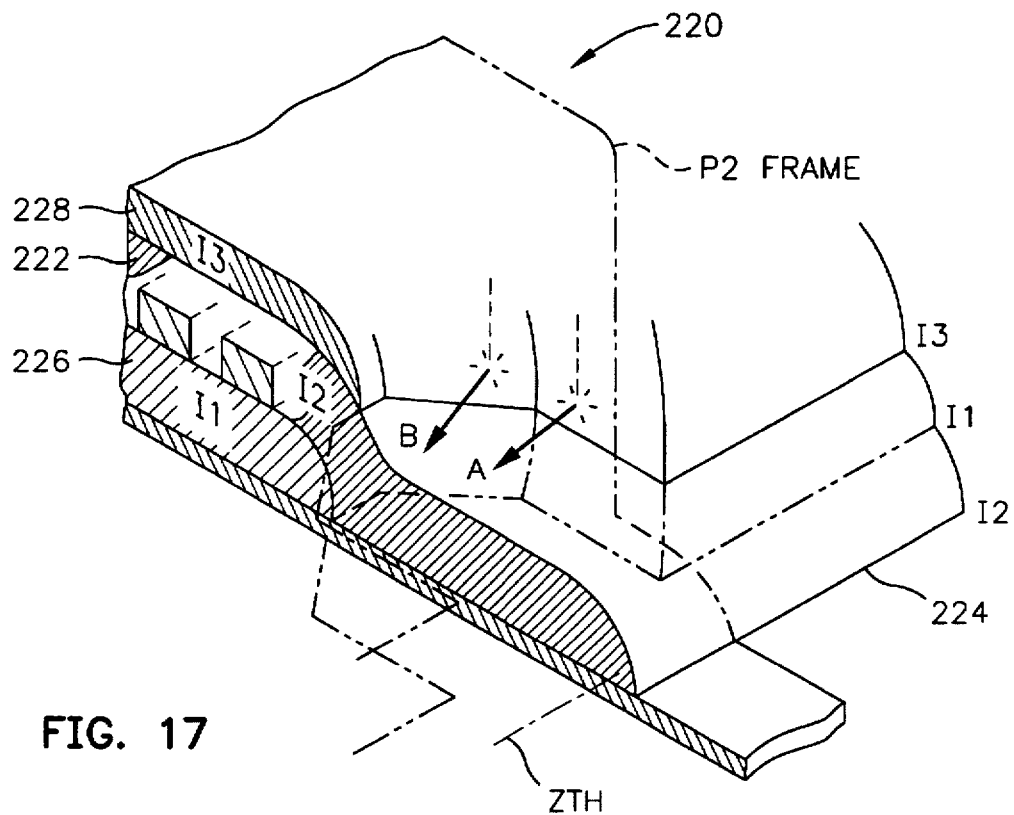
FIG. 17 is an isometric elevation view of the insulation stack of another embodiment of the invention wherein the second insulation layer is the ZTH defining layer.
Figure 18:
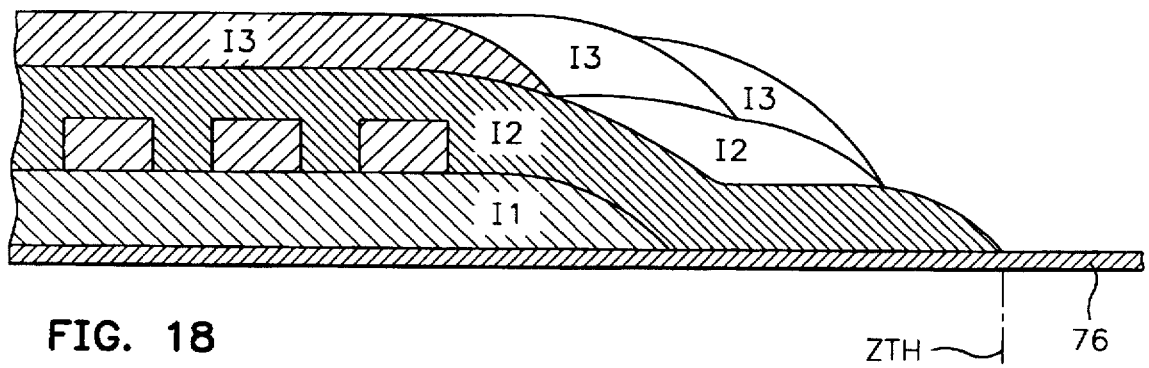
FIG. 18 is a cross-sectional elevation view of the insulation stack of FIG. 17.
Figure 19:
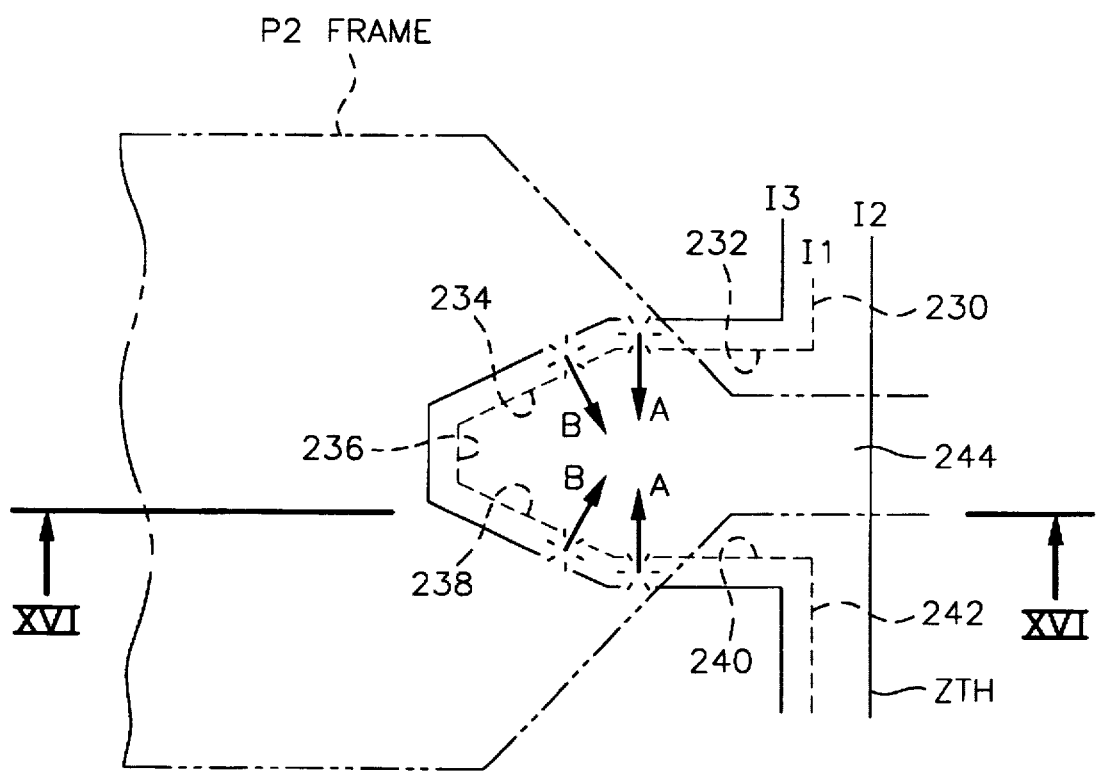
FIG. 19 is a schematic plan illustrating incidence light reflected from the third insulation layer of the insulation stack of FIGS. 17 and 18.

The second embodiment 220 of the present invention is illustrated in FIGS. 17–19. In this embodiment the second insulation layer 222 has a forward edge 224 which defines the ZTH. The second insulation layer 222 overlays sloping surfaces of a first insulation layer 226 and a third insulation layer 228 overlays the second insulation layer. The sloping surfaces of the first insulation layer are defined by straight edges 230, 232, 234, 236, 238, 240 and 242 as shown in FIG. 19. The edges 230 and 242 are straight edges which are colinear and parallel to the ABS and which define slopes which reflect light toward the ABS away from the pole tip region 244. The remainder of the slopes of the first insulation layer are defined by a non-linear edge which comprises straight edges 232, 234, 236, 238 and 240. This is the same configuration as the edges shown for the second insulation layer of the first embodiment 150 in FIG. 15. The second and third insulation layers 222 and 228 on top of the specially configured first insulation layer 226 replicate the sloping surfaces of the first insulation layer as shown in FIG. 17. These sloping surfaces direct light, as shown in part by rays A and B in FIGS. 17 and 19, into areas which will not cause reflective notching of the pattern for the second pole tip shown at 244 in FIG. 19.

Figure 20:
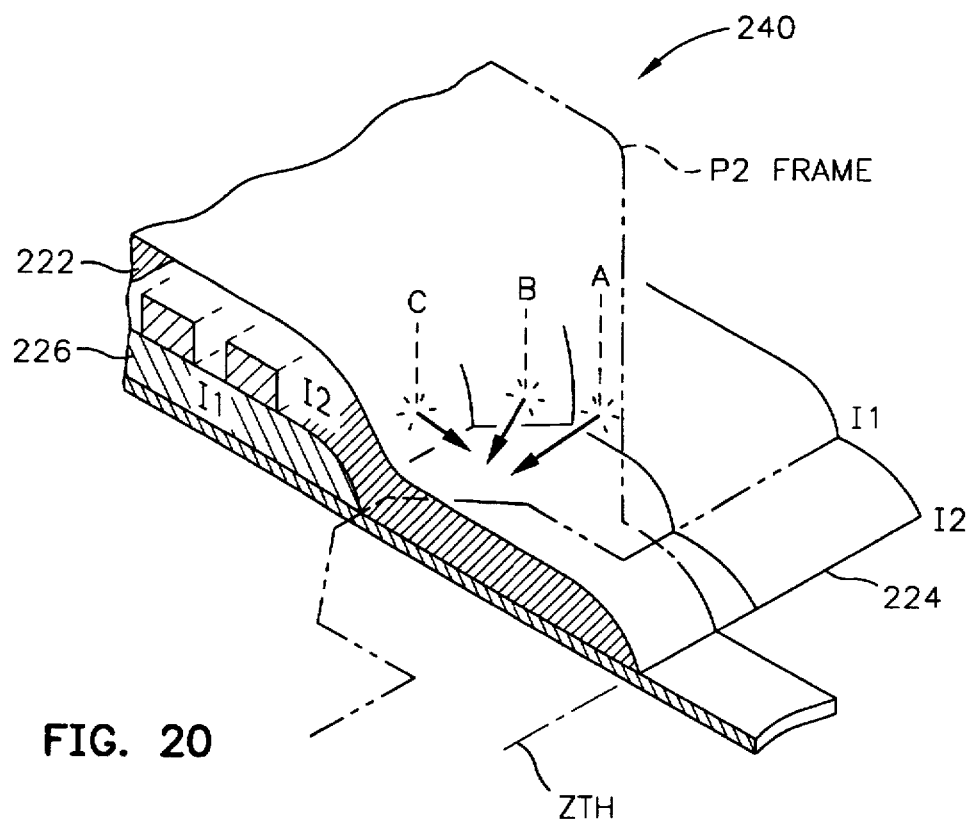
FIG. 20 is an isometric illustration of another embodiment of the invention showing an insulation stack with only two insulation layers wherein the second insulation layer is the ZTH defining insulation layer.
Figure 21:
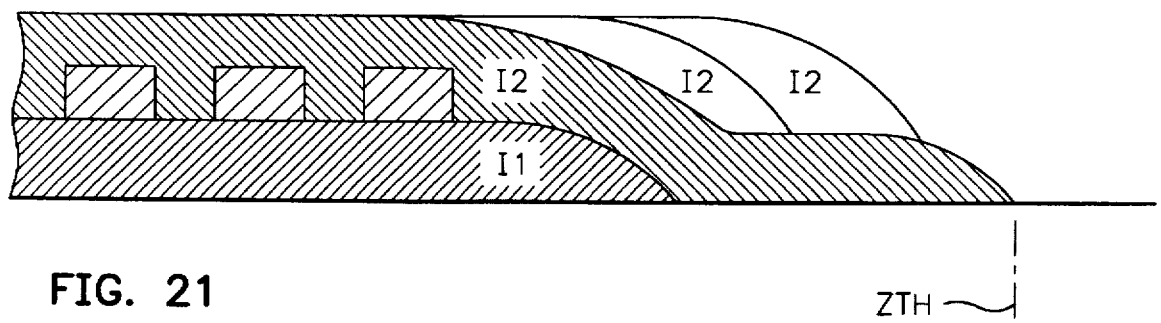
FIG. 21 is a side elevation view of the insulation stack of FIG. 20.
Figure 22:
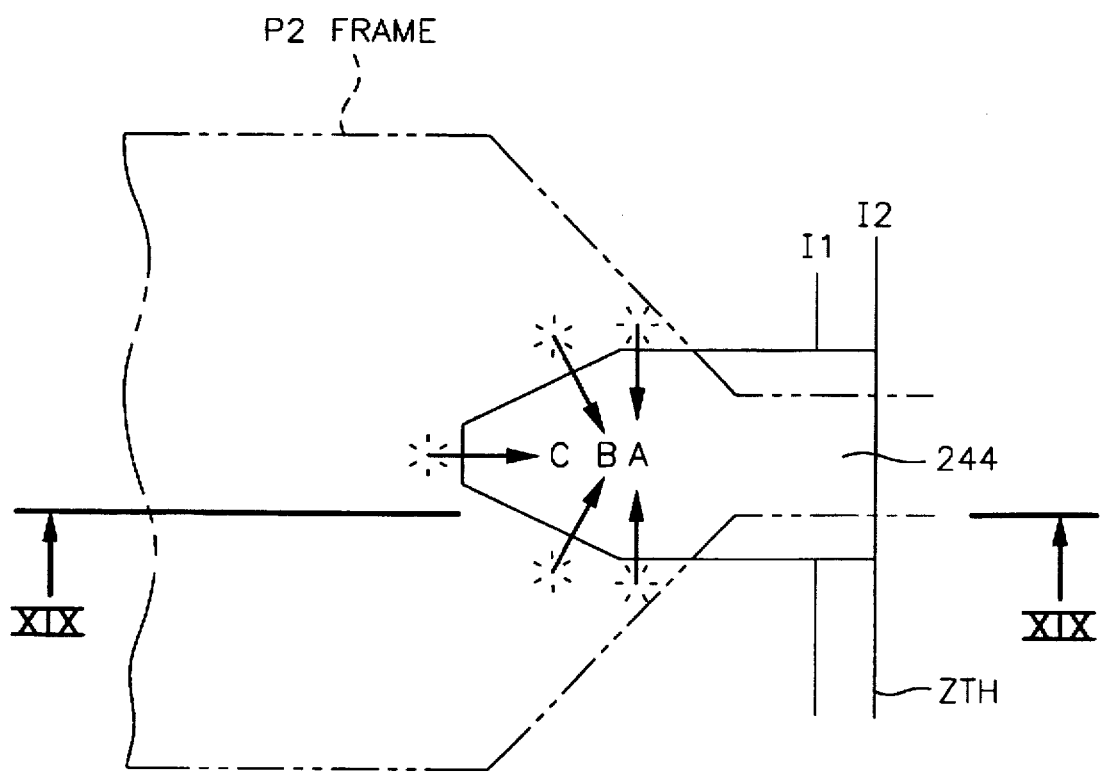
FIG. 22 is a schematic plan illustration of incidence light reflected from sloping surfaces of the second insulation layer which sloping surfaces are replications of sloping surfaces of the first insulation layer.

A third embodiment 240 of the present invention is shown in FIGS. 20–22. This embodiment is similar to the embodiment shown in FIGS. 17–19 except the third insulation layer has been omitted. The second insulation layer 222 has the front edge 224 which defines the ZTH. The underlying first insulation layer 226 has the specially configured sloping surfaces which eliminate reflective notching. The second insulation layer has sloping surfaces which replicate the sloping surfaces of the first insulation layer. As shown in FIGS. 17 and 20, the sloping surfaces of the second insulation layer reflect light rays A, B and C into areas away from the region for the second pole tip.

Figure 23:
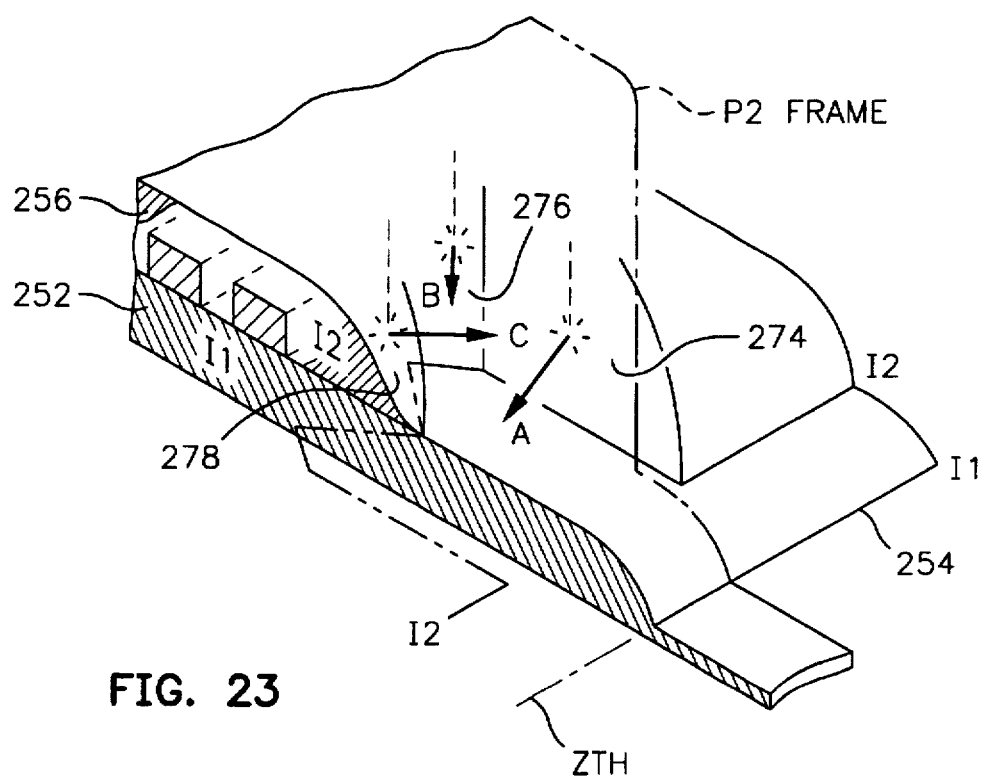
FIG. 23 is an isometric illustration of another embodiment of the invention.
Figure 24:
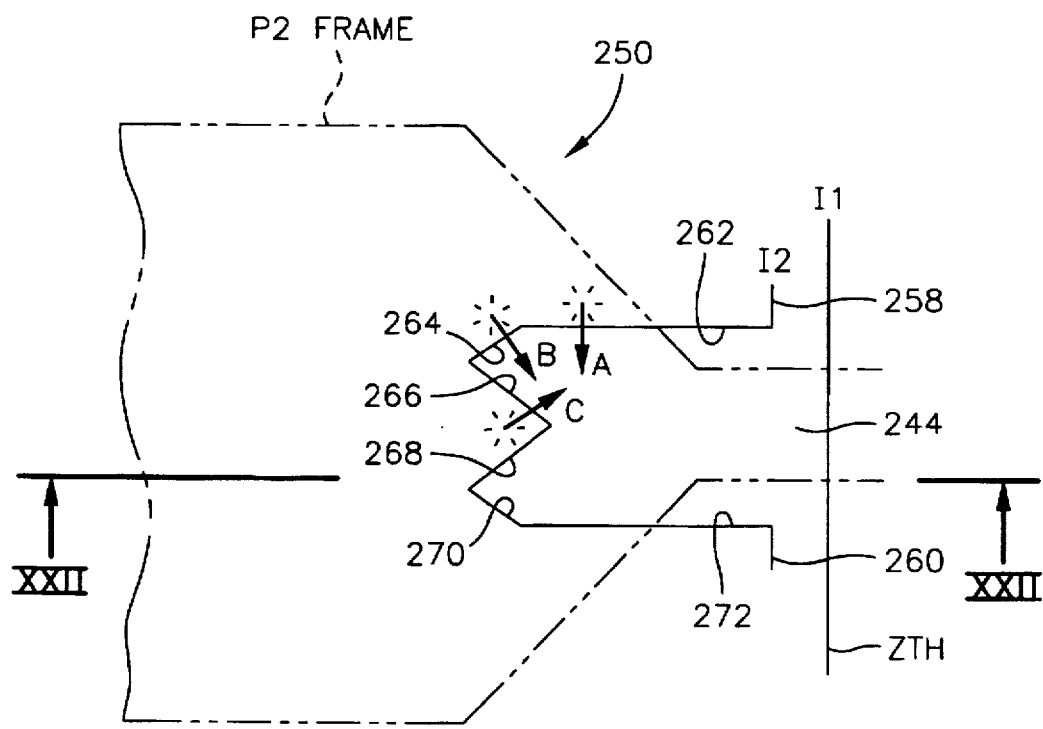
FIG. 24 is a schematic plan illustration of incidence light being reflected from the second insulation layer of the embodiment shown in FIG. 23.

A fourth embodiment 250 of the present invention is illustrated in FIGS. 23 and 24. In this embodiment the first insulation layer 252 has a front edge 254 which defines the ZTH. The second insulation layer 256 has laterally extending linear edges 258 and 260 which are parallel to the ABS and define sloping surfaces which reflect light away from the pattern 244 for the second pole tip. The second insulation layer 256 has a non-linear edge which comprises straight edges 262, 264, 266, 268, 270 and 272. The straight edges 262 and 272 are perpendicular to the ABS and the straight edges 264, 266, 268 and 270 are at acute or obtuse angles to the ABS. The straight edges 262, 264 and 266 define sloping edges 274, 276 and 278 respectively, which reflect light rays A, B and C away from the pattern 244 for the second pole tip.

Figure 25:
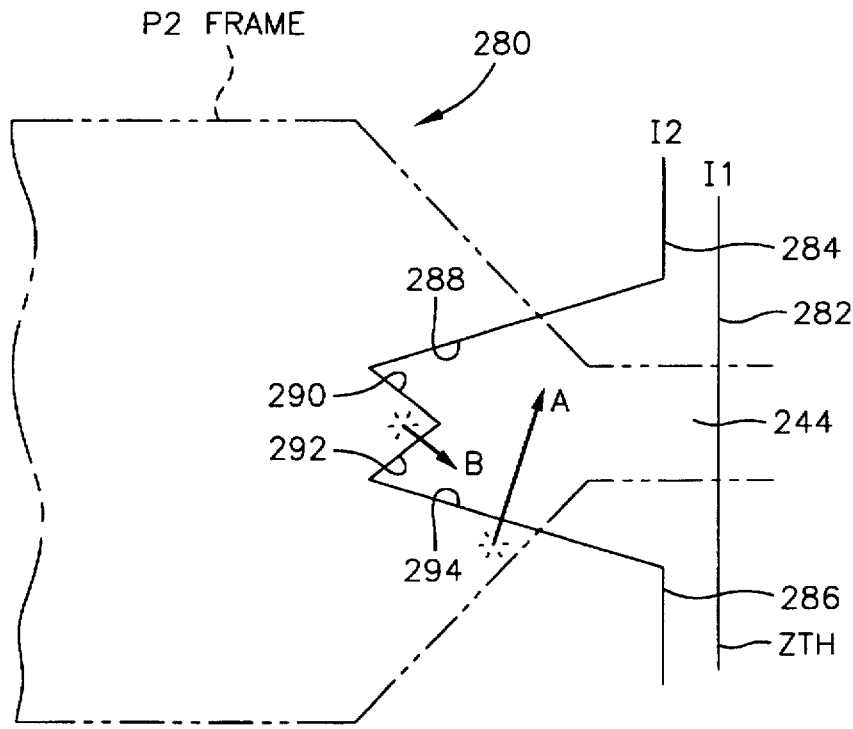
FIG. 25 is a schematic plan illustration of incidence light being reflected from the second insulation layer of a further embodiment of the invention.

A fifth embodiment 280 of the present invention is shown in FIG. 25. In this embodiment the front edge 282 of the first insulation layer defines the ZTH and the second insulation layer has sloping surfaces which direct light away from the pattern 244 for the second pole tip. The second insulation layer has laterally extending straight edges 284 and 286 which are parallel to the ABS and define sloping surfaces which direct light away from the pattern 244. The second insulation layer further has a non-linear edge which comprises straight edges 288, 290, 292 and 294 which are all non-perpendicular and non-parallel to the ABS. The straight edges 288, 290, 292 and 294 of the non-linear edge define sloping surfaces which direct light rays, such as rays A and B, away from the pattern 244 for the second pole tip.

Figure 26:
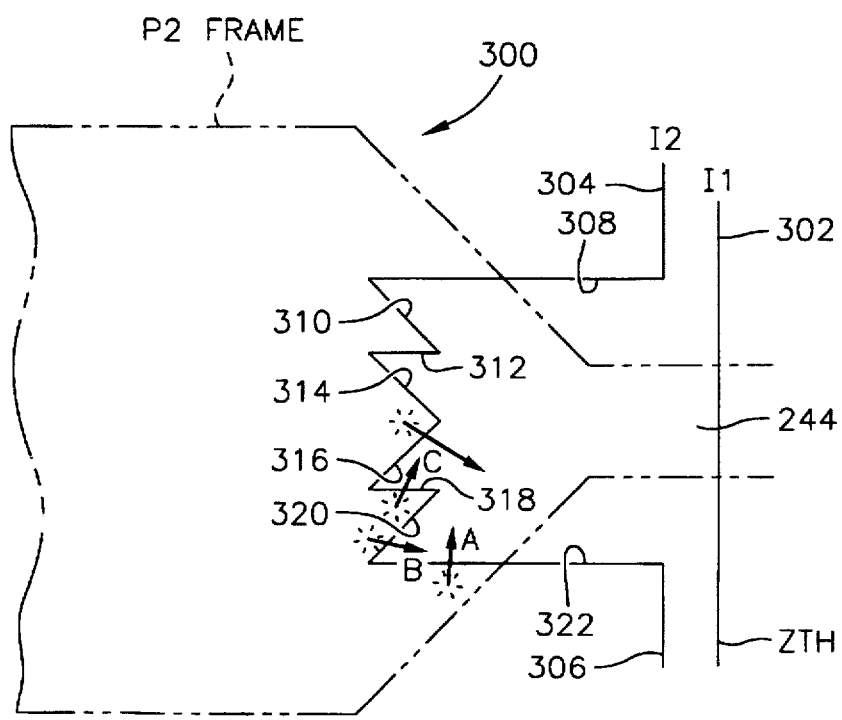
FIG. 26 is a schematic plan illustration of incidence light being reflected from still another embodiment of the present invention.

A sixth embodiment 300 of the present invention is illustrated in FIG. 26 wherein the first insulation layer has an edge 302 which defines the ZTH. The second insulation layer has the specially configured sloping surfaces so that light reflected therefrom will not cause reflective notching. The second insulation layer has laterally extending first and second straight edges 304 and 306 which extend parallel to the ABS and define sloping surfaces which reflect light outside the pattern 244 for the second pole tip. The second insulation layer further has a non-linear edge which comprises straight edges 308, 310, 312, 314, 316, 318, 320 and 322 which define corresponding sloping surfaces of the second insulation layer which direct light away from the pattern 244 as exemplified by light rays A, B and C. The straight edges 308, 312, 318 and 322 are perpendicular to the ABS and the straight edges 310, 314, 316 and 320 are non-parallel and non-perpendicular to the ABS. On each side of the head the first and second plurality of straight edges of the non-linear edge alternate with respect to one another.

Figure 27:
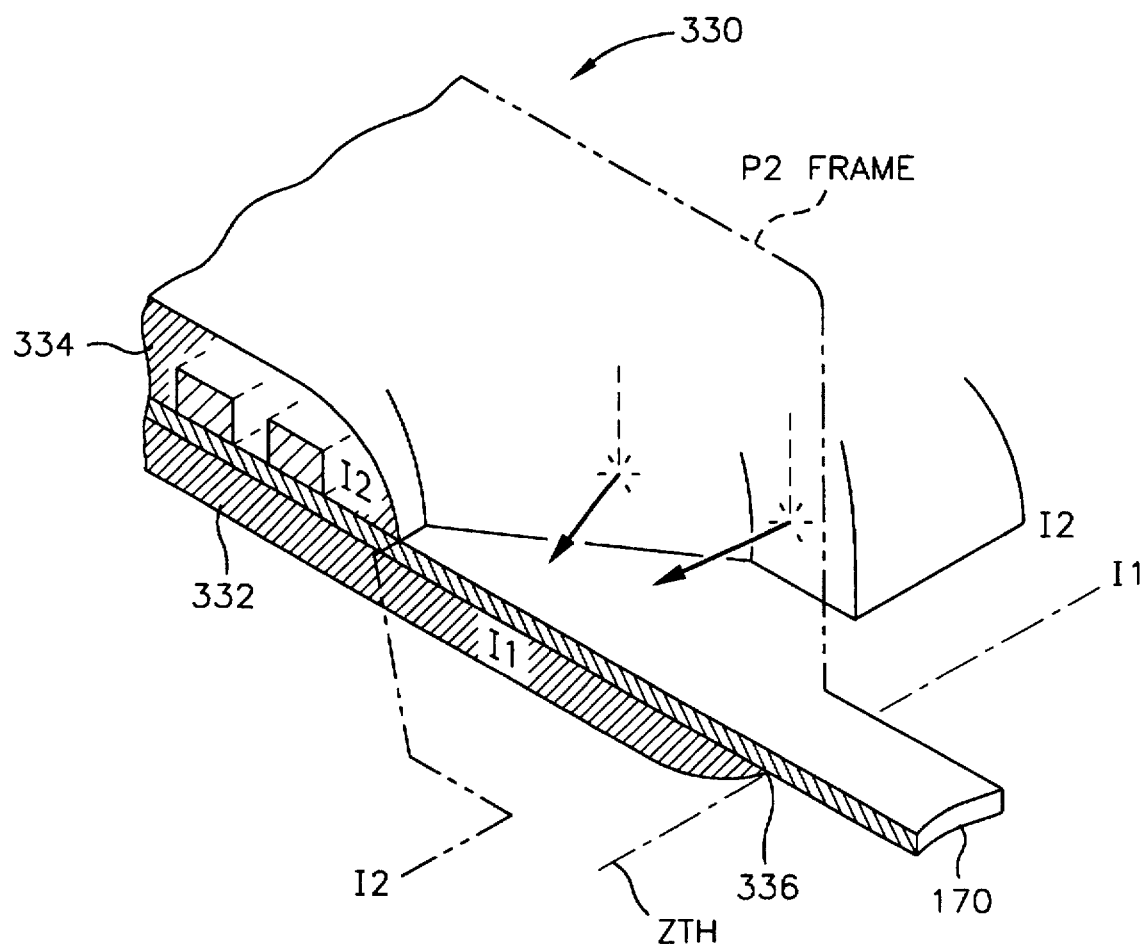
FIG. 27 is an isometric illustration of a still further embodiment of the present invention.

A seventh embodiment 330 of the present invention is illustrated in FIG. 27 wherein the first insulation layer 332 is embedded in the first pole piece layer (not shown). The gap layer 170 is sandwiched between the first insulation layer 332 and the second insulation layer 334. The front edge 336 of the first insulation layer defines the ZTH and the second insulation layer 334 is configured in the same manner as the second insulation layer shown in FIG. 15 for the first embodiment of the invention.

Clearly, other embodiments and modifications of this invention will occur readily to those of ordinary skill in the art in view of these teachings. In this regard it should be understood that the present magnetic head may optionally be employed in a magnetic tape drive. Therefore, this invention is to be limited only by the following claims, which include all such embodiments and modifications when viewed in conjunction with the above specification and accompanying drawings.

We claim:

1. A thin film inductive write head which has a pole tip region between an air bearing surface (ABS) and a flare point, a yoke region between the flare point and a back gap and a zero throat height (ZTH) between the ABS and the flare point, the head having a second pole piece which has a yoke in the yoke region and a second pole tip in the pole tip region, and a step in the fabrication of the yoke and second pole tip including patterning a photoresist layer with light directed through a mask to expose the photoresist layer with a pattern of the yoke and a pattern of the second pole tip, the head comprising:

an insulation stack which includes a plurality of insulation layers;

one of the insulation layers having a front edge between the ABS and the flare point for defining the ZTH;

another one of the insulation layers having a plurality of sloping surfaces which are reflective to said light directed through said mask;

each sloping surface terminating at a respective front edge, the front edges collectively forming a non-linear front edge; and the sloping surfaces being oriented so that said light reflected by the sloping surfaces of said another one of the insulation layers is directed into areas of the photoresist layer away from the pattern of the second pole tip.

2. A combined head including the inductive write head of claim 1, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

3. A magnetic disk drive including the combined head as claimed in claim 2, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the combined head, to the means for rotating the magnetic disk, and to the positioning means for exchanging signals with the combined head, for controlling movement of the magnetic disk and for controlling the position of the combined head.

4. A write head as claimed in claim 1 wherein the non-linear edge is composed of a plurality of straight edges which are non-parallel to the ABS.

5. A write head as claimed in claim 1 including:

a first pole piece;

said another insulation layer being a first insulation layer formed on the first pole piece;

a coil layer formed on the first insulation layer; and said one insulation layer being a second insulation layer formed on the coil layer.

6. A write head as claimed in claim 1 including:

said another one of the insulation layers having first and second parallel edges which are parallel to the ABS; and the non-linear edge being located between the first and second parallel edges and contiguous therewith.

7. A write head as claimed in claim 6 including:

a coil layer embedded in the insulation stack; and the non-linear edge being located between the coil layer and a line defined by the first and second parallel edges.

8. A write head as claimed in claim 1 including:

each front edge being a straight edge; and a first plurality of the straight edges being perpendicular to the ABS and a second plurality of the straight edges being at an acute or obtuse angle to the ABS.

9. A write head as claimed in claim 8 wherein the first and second plurality of straight edges alternate with respect to one another.

10. A write head as claimed in claim 1 including:

each front edge being a straight edge; and all of the straight edges being non-perpendicular and non-parallel to the ABS.

11. A write head as claimed in claim 1 including:

said one of the insulation layers having a flat portion which is located between its front edge and the coil layer, the flat portion defining a flat portion region; and the flare point being located within said flat portion region.

12. A write head as claimed in claim 11 wherein said front edges provide boundaries for said flat portion.

13. A write head as claimed in claim 12 including:

each front edge being a straight edge; and the non-linear edge being composed of a plurality of straight edges which are non-parallel to the ABS.

14. A combined head including the inductive write head of claim 13, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

15. A magnetic disk drive including the combined head as claimed in claim 14, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the combined head, to the means for rotating the magnetic disk, and to the positioning means for exchanging signals with the combined head, for controlling movement of the magnetic disk and for controlling the position of the combined head.

16. A write head as claimed in claim 13 wherein a first plurality of the straight edges is perpendicular to the ABS and a second plurality of the straight edges is at an acute or obtuse angle to the ABS.

17. A write head as claimed in claim 16 wherein the first and second plurality of straight edges alternate with respect to one another.

18. A write head as claimed in claim 13 including:

said another one of the insulation layers having first and second parallel edges which are parallel to the ABS; and the non-linear edge being located between the first and second parallel edges and contiguous therewith.

19. A write head as claimed in claim 18 including:

a coil layer embedded in the insulation stack; and the non-linear edge being located between the coil layer and a line defined by the first and second parallel edges.

20. A write head as claimed in claim 19 including:

a first pole piece;

said one insulation layer being a first insulation layer formed on the first pole piece;

the coil layer being formed on the first insulation layer; and said another insulation layer being a second insulation layer formed on said coil layer.

21. A combined head including the inductive write head of claim 20, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

22. A magnetic disk drive including the combined head as claimed in claim 21, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the combined head, to the means for rotating the magnetic disk, and to the positioning means for exchanging signals with the combined head, for controlling movement of the magnetic disk and for controlling the position of the combined head.

23. A write head as claimed in claim 19 including:

a first pole piece;

said another insulation layer being a first insulation layer formed on said first pole piece;

the coil layer being formed on the first insulation layer; and said one insulation layer being a second insulation layer formed on the coil layer.

24. A combined head including the inductive write head of claim 23, the combined head including:

a magnetoresistive (MR) stripe and first and second gap layers;

the MR stripe being sandwiched between the first and second gap layers;

first and second shield layers; and the first and second gap layers being sandwiched between the first and second shield layers.

25. A magnetic disk drive including the combined head as claimed in claim 24, the drive comprising:

a frame;

a magnetic disk rotatably supported in the frame;

a support mounted on the frame for supporting the combined head in a transducing relationship with the magnetic disk;

means for rotating the magnetic disk;

positioning means connected to the support for moving the combined head to multiple positions with respect to said magnetic disk; and means connected to the combined head, to the means for rotating the magnetic disk, and to the positioning means for exchanging signals with the combined head, for controlling movement of the magnetic disk and for controlling the position of the combined head.

* * * * *